(12) United States Patent
Curry et al.

(10) Patent No.: US 10,444,846 B2
(45) Date of Patent: Oct. 15, 2019

(54) ADJUSTABLE VIDEO PLAYER

(71) Applicant: Google Inc., Mountain View, CA (US)

(72) Inventors: Clifford Curry, San Francisco, CA (US); Matthew Darby, San Francisco, CA (US); Andrey Doronichev, San Francisco, CA (US); Bryce Gibson Reid, San Francisco, CA (US); Kevin Greene, San Francisco, CA (US); Andrew Janich, Mountain View, CA (US); Alan Joyce, Mountain View, CA (US); Taeho Ko, San Francisco, CA (US); Justin Lewis, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 730 days.

(21) Appl. No.: 14/144,778

(22) Filed: Dec. 31, 2013

(65) Prior Publication Data

US 2015/0040009 A1 Feb. 5, 2015

Related U.S. Application Data

(60) Provisional application No. 61/860,748, filed on Jul. 31, 2013.

(51) Int. Cl.
*G06F 3/01* (2006.01)
*G06F 3/0488* (2013.01)

(52) U.S. Cl.
CPC .......... *G06F 3/017* (2013.01); *G06F 3/04886* (2013.01); *G06F 2203/04803* (2013.01)

(58) Field of Classification Search
CPC .............. G06F 3/017; G06F 3/04886; G06F 2203/04803
See application file for complete search history.

(56) References Cited

U.S. PATENT DOCUMENTS

| | | | |
|---|---|---|---|
| 6,765,592 B1 * | 7/2004 | Pletcher | G06F 9/4443 715/760 |
| 2003/0208751 A1 * | 11/2003 | Kim | H04N 21/4316 725/1 |
| 2004/0261106 A1 * | 12/2004 | Hoffman | H04N 5/44543 725/43 |

(Continued)

OTHER PUBLICATIONS

Youtube.com, Jan. 1, 2012, https://web.archive.org/web/20120101002844/http://www.youtube.com/, pp. 1-7.*

(Continued)

*Primary Examiner* — William L Bashore
*Assistant Examiner* — Daniel W Parcher
(74) *Attorney, Agent, or Firm* — Lowenstein Sandler LLP

(57) ABSTRACT

A method for providing an adjustable video player is disclosed. The method includes providing, by an electronic device, a content item player for playback of a content item in a portion of a user interface (UI) of an application executed on the electronic device and receiving an indication of a gesture to minimize the content item player made by a user of the electronic device. The method further includes minimizing the content item player into a miniplayer shown on the application UI without interrupting the playback of the content item in the content item player.

29 Claims, 13 Drawing Sheets

(56) References Cited

U.S. PATENT DOCUMENTS

| | | | | |
|---|---|---|---|---|
| 2007/0003224 | A1* | 1/2007 | Krikorian | G06F 3/0481 386/220 |
| 2008/0074550 | A1* | 3/2008 | Park | H04N 5/445 348/565 |
| 2008/0084400 | A1* | 4/2008 | Rosenberg | G06F 1/1626 345/173 |
| 2008/0276272 | A1 | 11/2008 | Rajaraman et al. | |
| 2010/0201879 | A1* | 8/2010 | VanDuyn | H04N 5/45 348/565 |
| 2010/0211693 | A1 | 8/2010 | Master et al. | |
| 2011/0113354 | A1* | 5/2011 | Thiyagarajan | G09G 5/14 715/760 |
| 2011/0239140 | A1* | 9/2011 | Chaudhri | G06F 3/0481 715/760 |
| 2012/0092381 | A1* | 4/2012 | Hoover | G06F 3/04883 345/662 |
| 2013/0086532 | A1* | 4/2013 | Shakespeare | G06F 3/04883 715/863 |
| 2013/0145267 | A1* | 6/2013 | Ramachandran | G06F 3/04883 715/719 |
| 2013/0215040 | A1* | 8/2013 | Bose | G06F 3/0416 345/173 |
| 2013/0290848 | A1* | 10/2013 | Billings | H04L 51/32 715/719 |
| 2013/0318429 | A1* | 11/2013 | Dantas | G06F 3/048 715/234 |
| 2014/0082498 | A1* | 3/2014 | Xiang | G06F 17/30899 715/719 |
| 2014/0123021 | A1* | 5/2014 | Walkin | G06F 9/4443 715/746 |
| 2014/0282730 | A1* | 9/2014 | Hieb | H04N 21/472 725/41 |

OTHER PUBLICATIONS

HowTech, How to use video and audio chat function in gmail, Apr. 27, 2012, Youtube.com, https://www.youtube.com/watch?v=Gnvm38Qfrt8, pp. 1-4.*

Biersdorfer, J.D., "iPad 5th Edition the missing manual," Dec. 31, 2012, retrieved from the Internet: http://cdn.oreillystatic.com/mm/0636920024910/iTunes_11_Update_for_iPad_5E.pdf [retrieved on Aug. 19, 2014], 28 pages.

Tekunoloji, "iTunes 11.0.3 Update (New MiniPlayer)," May 16, 2013, retrieved from the Internet: http://www.youtube.com/watch?v=192yYXOweTo [retrieved on Aug. 18, 2014], 1 page.

International Search Report for International Patent Application No. PCT/US2014/038840, dated Sep. 5, 2014, 5 pages.

Written Opinion of the International Searching Authority for International Patent Application No. PCT/US2014/038840, dated Sep. 5, 2014, 8 pages.

* cited by examiner

300

While the content item player is in mini-player view format within the application UI, receive indication of a user gesture made with respect to content item player UI portion of the application UI
360

Determine navigation action corresponding to received indication of user gesture
370

If navigation action is to dismiss the content item player UI, stopping playback of the content item player and removing the mini-player format UI from the application UI
380

If navigation action is to maximize the content item player UI, returning the content item player from the mini-player format UI to an original viewing format of the content item player UI in the application UI without interrupting playback of the content item player
390

Provide, to a content sharing platform application at a client device, data of a content item hosted by the content sharing platform and data of a content item player UI for use in playback of the content item by the application
410

Receive, from the application at the client device, an indication of gesture to minimize the content item player UI by a user of the application
420

In response to the receiving indication of the gesture to minimize, providing data to the application for generating a mini-player view of the content item player UI, the application to utilize the received data to generate the mini-player UI in an application UI without interrupting playback of the content item in the content item player UI
430

Receive data corresponding to user interactions with the application UI while the application continues to provide playback of the content item in the mini-player format UI within the application UI
440

FIG. 4

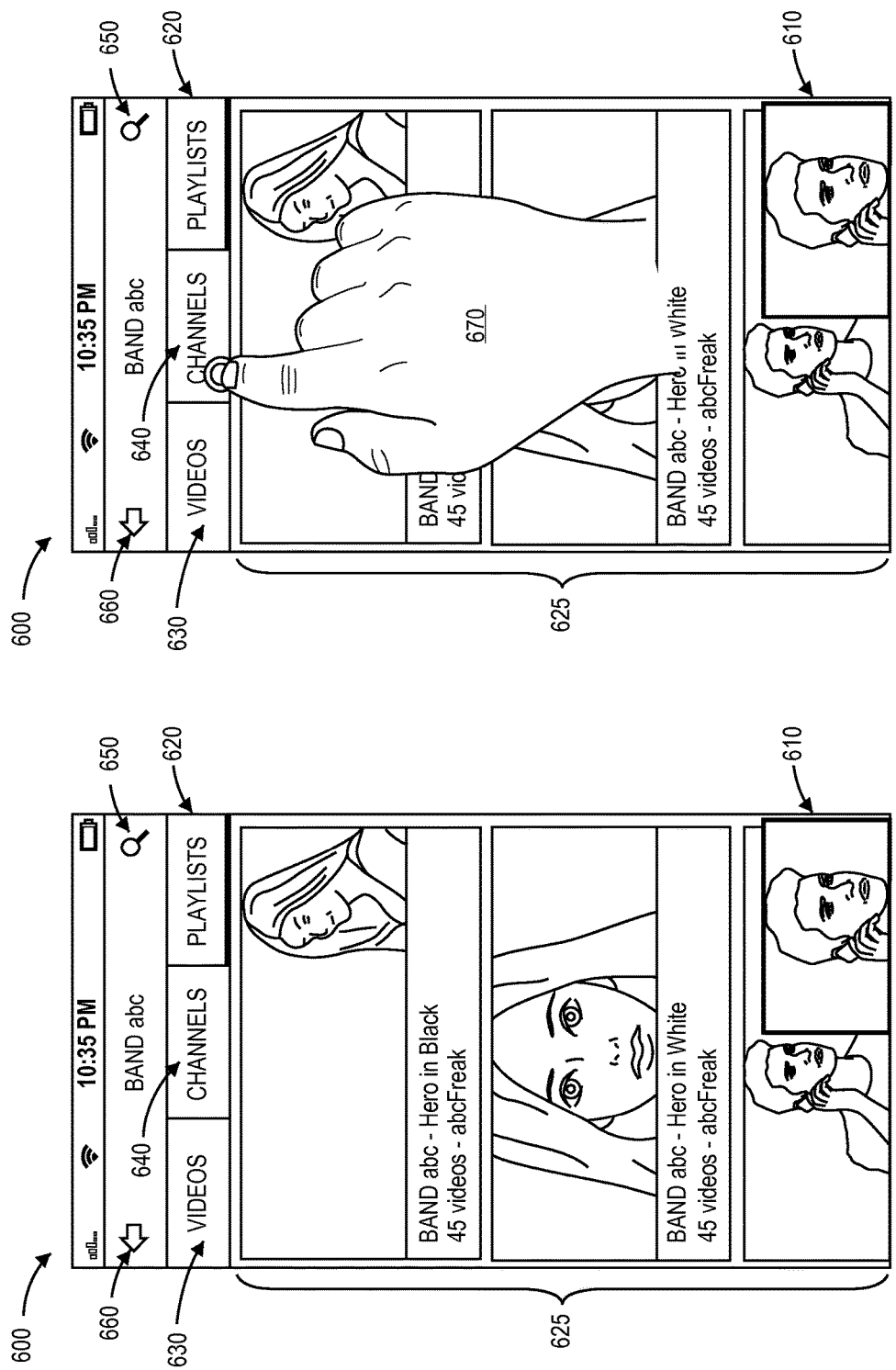

ADJUSTABLE VIDEO PLAYER

RELATED APPLICATION

This application claims the benefit under 35 U.S.C. § 119(e) of U.S. Patent Provisional Application No. 61/860,748, filed on Jul. 31, 2013, the entirety of which is incorporated herein by reference.

TECHNICAL FIELD

This disclosure relates to the field of content sharing platforms and, in particular, to an adjustable video player.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Content delivery on mobile devices is still a relatively new concept. For example, only recently has it been possible to play high-quality video on mobile devices, as this ability has been tied to the introduction of more-advanced telecommunication technologies. As such, most content sharing platforms are still in the early stages of building products for mobile devices.

Currently, options for content item players (e.g., a video player on a social network page or social network application on a mobile device) provided by content sharing platforms are limited and static. For example, content item players generally do not persist while the user is performing other activities, such as browsing. In addition, current content item players are generally static (e.g., cannot be resized). Instead, a user is forced to stop playback of the content item player to perform another activity (other than viewing playback of the content item on the content item player) and then return to the previous view to re-start the content item player. This can be disruptive and negatively affect the viewing user experience.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing an adjustable video player is disclosed. The method includes providing, by an electronic device, a content item player for playback of a content item in a portion of a user interface (UI) of an application executed on the electronic device and receiving an indication of a gesture to minimize the content item player made by a user of the electronic device. The method further includes minimizing the content item player into a mini-player shown on the application UI without interrupting the playback of the content item in the content item player.

In one implementation, the mini-player may persist on top of the application UI while the user interacts with the application UI. In addition, the user may interact with at least one of a suggestions interface, a search interface, a browsing interface, a settings interface, a subscriptions interface, a playlists interface, a favorites interface, a history interface, or an uploads interface of the application UI while the mini-player provides uninterrupted playback of the content item to the user.

In another implementation, the gesture to minimize the content item player may include at least one of a selection of a minimization indicator on the content item player or swiping in a predetermined direction on the content item player. The method may also include receiving an indication of a gesture made by the user to dismiss the mini-player, stopping playback of the content item in the mini-player, and removing the mini-player from the application UI. Furthermore, the gesture made by the user to dismiss the mini-player may include a swipe gesture in a predetermined direction in a UI of the mini-player. In addition, the removing the mini-player further comprising applying at least one of animation or fading to the mini-player while the mini-player is removed from the application UI In some implementations, the method further includes receiving an indication of a gesture made by the user to maximize the mini-player, and returning the content item player to an original presentation format in the application UI. In addition, the gesture made by the user to maximize the mini-player may include at least one of a tap in the UI of the mini-player, a click in the UI of the mini-player, or a swipe gesture in a predetermined direction in the UI of the mini-player.

Furthermore, the minimizing the content item player in the method may include applying animation to the content item player while the content item player transforms into the mini-player. In addition, a display quality format of the mini-player is the same as the display quality format of the content item player when originally displayed in the application UI.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIGS. 3A and 3B are flow diagrams illustrating a method for providing a dynamic size-adjustable content item player by a client device, according to some implementations of the disclosure.

FIG. 4 is a flow diagram illustrating a method for providing a dynamic size-adjustable content item player at a client device by a server device, according to some implementations of the disclosure.

FIGS. 6A, 6B, and 6C are example screenshots illustrating UIs for providing a dynamic size-adjustable content item player.

DETAILED DESCRIPTION

Implementations are described for an adjustable video player. In implementations of the disclosure, a dynamic size-adjustable content item player is provided. Specifically, the dynamic size-adjustable content item player may be persistently visible when playing a content item and interacting with an application of the content sharing platform at the same time. The dynamic size-adjustable content item player provides a "watch-while" experience. The "watch-while" experience allows a user of a content sharing platform to minimize the content item player into a smaller view in an interface of the application of the content sharing platform. With the content item minimized into a smaller view, the user may then continue interacting with the content sharing application to, for example, decide what to watch next, search for another content item, and/or browse content items of the content sharing platform, without interrupting playback of the content item.

Implementations of the disclosure have a different layer of granularity than previous solutions for providing content item players for content sharing platforms. Previously, embedded content item players provided by content sharing platforms were limited in configuration options and static with reference to activities of the user. Implementations of the disclosure improve content item players of content sharing platforms by configuring the content item players to be dynamically size-adjustable and persistent on an application UI of the content sharing platform. As a result, the dynamic size-adjustable content item player described herein may improve the user's interactions and experience with the content sharing platform.

Figure 1:
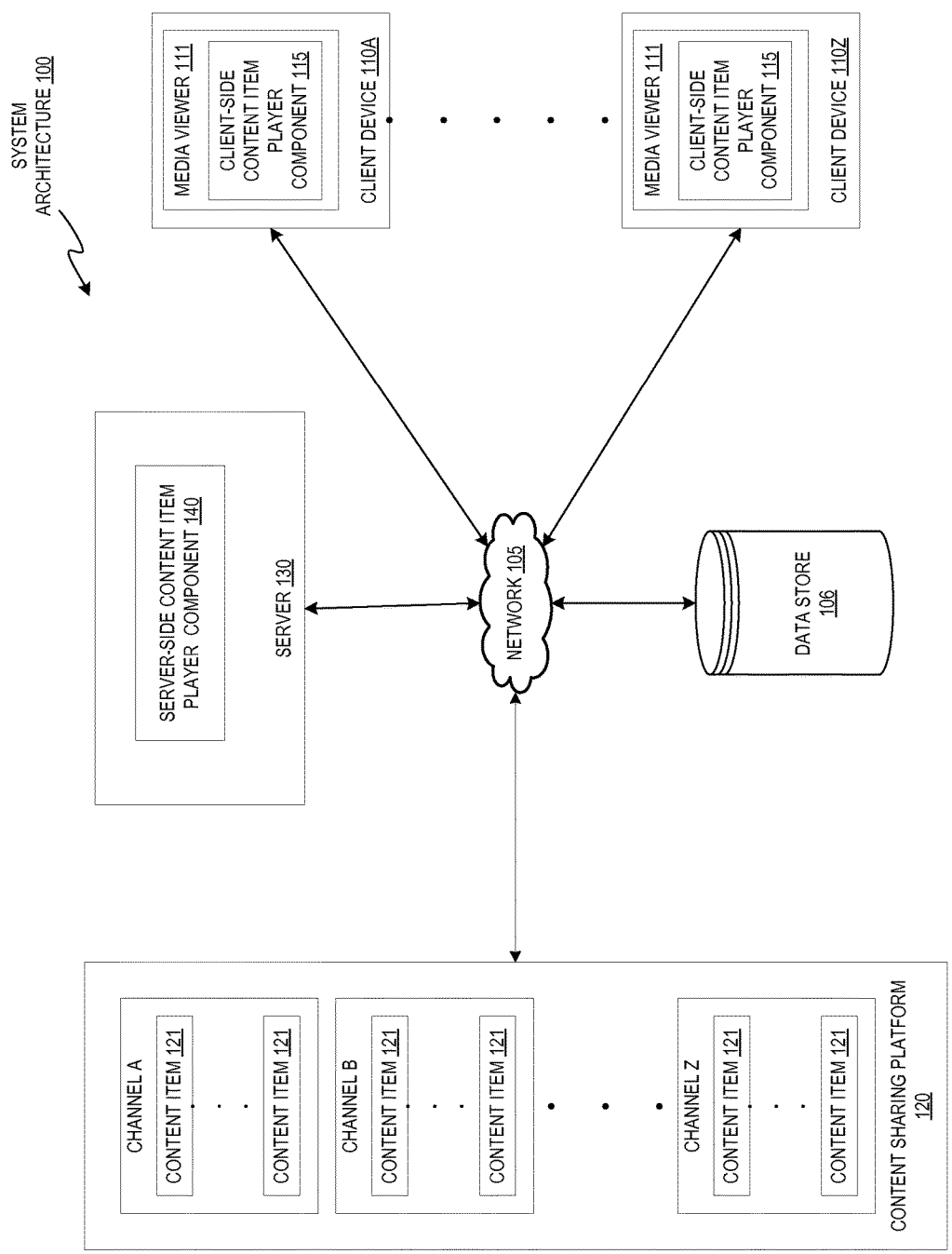
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls and contextual synchronization. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consumer, upload, search for, approve of ("like"), dislike, and/or comment on media items. The content sharing platform 120 may also include a website (e.g., a webpage) that may be used to provide a user with access to the media items. Content sharing platform 120 may include any type of content delivery network providing access to content and/or media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Although channels are described as one implementation of a content sharing platform, implementations of the disclosure are not limited to content sharing platforms that provide content items via a channel model.

Each channel may include one or more content items 121. Examples of a content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 is also referred to as a media item.

A content item 121 may be consumed via the Internet and/or via a mobile device application. For brevity and simplicity, an online video (also hereinafter referred to as a video) is used as an example of a content item 121 throughout this document. As used herein, "media," media item," "online media item," "digital media," "digital media item," "content," and "content item" can include an electronic file that can be executed or loaded using software, firmware or hardware configured to present the digital content item to an entity. In one implementation, the content sharing platform 120 may store the content items 121 using the data store 106.

In one implementation, the server 130 may be one or more computing devices (e.g., a rackmount server, a server computer, etc.). In one implementation, the server 130 may be included in the content sharing platform 120. The server 130 may include a server-side content item player component 140. In other implementations, the media viewer 111 at the client device 110A-110Z includes a client-side content item player component 115. The content item player components 115, 140 may operate together to provide a dynamic size-adjustable content item player viewable at the client device 110A-110Z. In other implementations, one or the other of the content item player component 115, 140 may individually be responsible for providing the dynamic size-adjustable content item player viewable at the client device 110A-110Z.

More specifically, in implementations of the disclosure, the content item player components 115, 140 may generate the dynamic size-adjustable content item player at the media viewer to provide playback of a content item 121 of the content sharing platform 120. Specifically, the dynamically-resizing content item player may be persistently visible to the user of the media viewer 111 while playing back a content item 121 at the media viewer 111, even while the user simultaneously performs other tasks and activities to interact with the content sharing platform 120 via the media viewer 111.

As a result, the dynamic size-adjustable content item player provides a "watch-while" experience. The "watch-while" experience allows the user of the content sharing platform 120 at client device 110A-110Z to minimize the content item player into a smaller sub-view (also referred to as a "mini-player") in the interface (e.g., a graphical user interface (GUI)) of the media viewer 111 without interrupting the playback of the content item in the content item player. With the content item player minimized, the user could then browse and interact with other interfaces, functions and menus related to the content sharing platform 120 that are provided by the media viewer 111, but separate from viewing the content item 121 in the content item player. For example, the other interfaces, functions and menus may include a suggestions interface of what to watch next, a search interface for content items of the content sharing platform, a browsing interface for content items of the content sharing platform, a settings interface, a subscriptions interface, a playlists interface, a favorites interface, a history interface, an uploads interface, and so on. The user may interact with these interfaces, functions, and menus as they normally would without interrupting playback of the content item 121. Further description of the content item player components 115, 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users or to any type of content delivery platform providing content to end users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
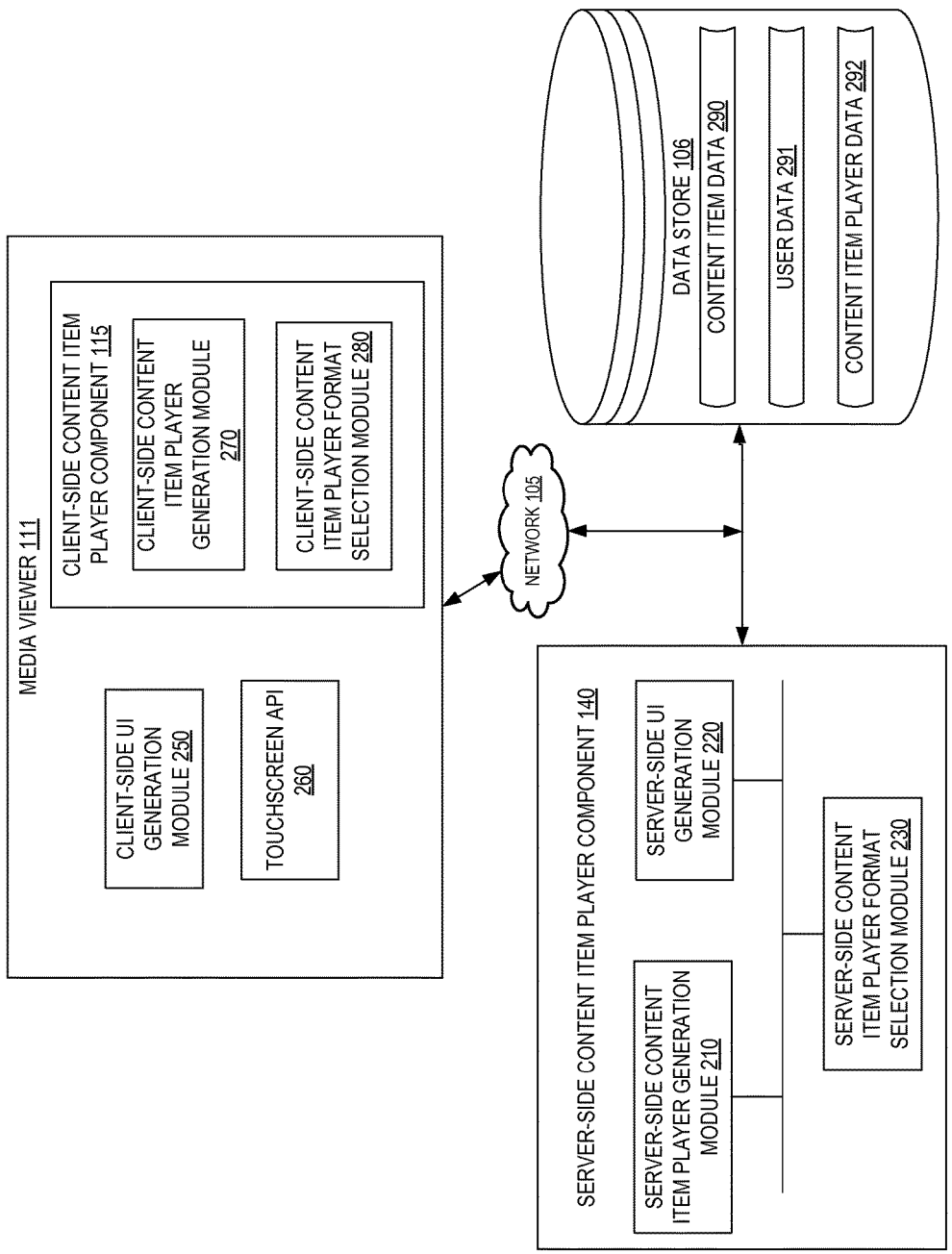
FIG. 2 is a block diagram illustrating content item player components in accordance with one implementation of the disclosure.

FIG. 2 is a block diagram illustrating a client-side content item player component 115 and server-side content item player component 140 in accordance with one implementation of the disclosure. In one implementation, the server-side content item player component 140 includes a content item player generation module 210, a user interface (UI) generation module 220, and a content item player format selection module 230. More or less components may be included in the server-side content item player component 140 without loss of generality. For example, two of the modules may be combined into a single module, or one of the modules may be divided into two or more modules. In one implementation, one or more of the modules may reside on different computing devices (e.g., different server computers).

The media viewer 111 may be part of a client device, such as client device 110a-110Z of FIG. 1. Media viewer 111 may include a client-side UI generation module 250, a touch-screen application programming interface (API) 260, and a client-side content item player component 115. In one implementation, the client-side content item player component 115 is the same as its counterpart described with respect to FIG. 1. Client-side content item player component 115 may include a client-side content item player generation module 270 and a client-side content item player format selection module 280. More or less components may be included in the media viewer 111 and/or the client-side content item player component 115 without loss of generality. For example, two of the modules may be combined into a single module, or one of the modules may be divided into two or more modules.

The server-side content item player component 140 and the media viewer 111 may be communicatively coupled to each other and to the data store 106. For example, the server-side content item player component 140 and the media viewer 111 may be coupled to each other and the data store 106 via a network (e.g., via network 105 as illustrated in FIG. 1). In another example, the server-side content item player component 140 may be coupled directly to a server where the server-side content item player component 140 resides (e.g., may be directly coupled to server 130).

The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, and content item player data 292.

As discussed above, one or both of client-side and/or server-side content item player component 115, 140 provides a dynamic size-adjustable content item player in media viewer 111 for persistent playback of content items of the content sharing platform. In one implementation, client-side UI generation module 250 provides a UI for the content sharing platform to present to a user via media viewer 111. The UI may include menus and interfaces for the user to interact with the content sharing platform via media viewer 111. For example, the menus and interfaces may include a suggestions interface of what to watch next, a search interface for content items of the content sharing platform, a browsing interface for content items of the content sharing platform, a settings interface, a subscriptions interface, a playlists interface, a favorites interface, a history interface, an uploads interface, and so on. When the user selects a content item to view via one of the menus or interfaces, or when the media viewer is initially opened as a result of the user's selection of a content item in a different application on the client device than the media viewer 111, the client-side UI generation module 250 may provide a content item player for playback of the selected content item.

As part of providing the content item player, client-side UI generation module 250 may receive content item data 290 and/or user data 291 from content sharing platform. For example, client-side UI generation module 250 may receive this data 290, 291 in response to the user selecting the content item for playback via a menu or interface of the media viewer 111. In some implementations, content item data 290 is streamed to media viewer 111 by content sharing platform for playback by media viewer 111 to the user.

In one implementation, the client-side UI generation module 250 may pass the received data 290, 291 onto client-side content item player component 115 in order for client-side content item player generation module 270 to generate a content item player for playback of the content item at media viewer 111. The content item player may be presented in a variety of formats, depending on a type of client device and/or the actions of the user on the client device. Data corresponding to the generated content item player, such as format and user preferences, may be stored in content item player data 292 of data store 106. In one implementation, when the content item player is generated, the UI of the media viewer 111 may include both the content item player and an information section. The content item player displays playback of a current selected media item of the playlist. The information window may display information regarding the current selected content item shown in the content item player and/or a list of the content items in a playlist, for example. In other implementations, the content item player may encompass the entire UI of media viewer 111.

In other implementations, server-side content item player component 140 may be responsible for generating the content item player. The server-side content item player generation module 210 send data for generating the content item player to the media viewer 111. In some implementations, the server-side content item player generation module 210 may interact with the server-side UI generation module 220 to determine the format and other client-device specific features for the content item player to be displayed in the content sharing platform UI of the media viewer 111. Media viewer 111 may then display the UI and content item player based on the received data from server-side content item player component 140. In other implementations, the server-side content item player component 140 and the client-side content item player component 115 may cooperate to generate the content item player at media viewer 111.

In implementations of the disclosure, the content item player at media viewer 111 is a dynamic size-adjustable content item player that is persistently visible to the user of the media viewer 111 while playing back the content item. As a result, the dynamic size-adjustable content item player provides a "watch-while" experience. The "watch-while" experience allows the user of the content sharing platform to minimize the content item player into a smaller view (also referred to as a "mini-player") in the UI of the media viewer 111 without interrupting the playback of the content item in the content item player. With the content item player minimized, the user can then browse and interact with other interfaces, functions and menus related to the content sharing platform that are provided by the media viewer 111, but separate from viewing playback of content items in the content item player.

For example, the other interfaces, functions and menus may include a suggestions interface of what to watch next, a search interface for content items of the content sharing platform, a browsing interface for content items of the content sharing platform, a settings interface, a subscriptions interface, a playlists interface, a favorites interface, a history interface, an uploads interface, and so on. The user may interact with these interfaces, functions, and menus as they normally would without interrupting playback of the content item.

In implementations of the disclosure, the content item player may be minimized, maximized, and/or dismissed via gesture controls that are relative to the content item player portion of the media viewer UI. Regardless of a location of the content item player within the UI, gesture controls detected with respect to the content item player portion of the UI may operate to change a view of the content item player.

In one implementation, the client device may provide a touchscreen API 260 to the media viewer 111 to enable gesture control recognition by the media viewer 111. The touchscreen API 260 may translate gestures made on a touchscreen of the client device into data signals that are understandable to the media viewer 111. The client-side content item player generation module 270 may receive information regarding a received gesture from the touchscreen API 260, and determine a corresponding action to take with respect to re-sizing and positioning the content item player within the UI of the media viewer 111. In other implementations, the touchscreen API 260 may provide the data signals of the translated gestures to the server-side content item player generation module 210 for similar processing.

Various user gestures are envisioned that may dynamically-resize the content item player. For example, the content item player may include a minimize icon, such as a down arrow ('↓'), downward-pointing caret ('v'), or any other minimizing indicator, that, when selected (e.g., tapped or clicked)) by the user, causes the content item player to re-size into a "mini-player" view within the UI of the media viewer 111. In another example, the user may swipe on the UI of the content item player to cause the content item player to be re-sized to the "mini-player" view. For example, the user may swipe in a downwards direction on the UI to re-size the content item player into the "mini-player" view. Other swipe directions and/or gestures may also be implemented to re-size the content item player in other implementations of the disclosure.

While the content item player is re-sizing in implementations of the disclosure, the playback of the content item continues uninterrupted in the content item player. In some implementations, an animation and/or fading (to either or both of video and audio portions of the content item) may apply to the content item player while it is minimizing from the original maximized format into the "mini-player" format. In one implementation, the "mini-player" view is a thumbnail size view of the content item player. The "mini-player" version of the content item player (e.g., mini-player) may be implemented in any of a variety of sizes and is not limited to a specific position within the UI of the media viewer 111. The mini-player may also be moved (e.g., dragged) within the GUI to suit the user's preferences. In one implementation, the mini-player may be "snapped" to a pre-determined size and position within the GUI. For example, the mini-player may be positioned relative to other elements of the GUI within the media viewer 111 and/or outside of the media viewer 111.

While the content item player is in the "mini-player" format, the playback of the content item continues to display in the content item player. As discussed above, the user may access and interact with other content sharing platform interfaces, menus, and functions in the UI of the media viewer 111.

In some implementations, the user may tap on the mini-player UI or drag the mini-player UI in order to return the content item player to its original format (e.g., maximize the content item player). For example, the user may swipe in a upwards direction on the UI to return the content item player to its original format. Other swipe directions and/or gestures may also be implemented to return the content item player to its original format in other implementations of the disclosure.

The user may also swipe along a different axis on the "mini-player" in order to dismiss the content item player (e.g., stop playback of the content item and remove the "mini-player" from the UI of the media viewer 111). For example, the user may swipe left or right on the "mini-player" to dismiss the content item player. In some implementations, an animation and/or fading (to either or both of video and audio portions of the content item) may apply to the "mini-player" while it is being dismissed from the GUI. Other user gestures to maximize or dismiss the "mini-player" are also envisioned and are not limited to the gestures detailed above.

In another implementation, the content item player may be presented in a semi-transparent format while the user is performing other activities in the UI of the media viewer 111. The user's interaction with the UI of the media viewer 111 may be passed through to the content below the semi-transparent player, and the user could, for example, browse while watching the content item player. In some implementations, the content item player may remain in its original location, while the "browsing" content is presented on top of the content item player (in some cases, the content item player may be partially obscured).

In other implementations, the content item player maintains the same quality and resolution of the presented content item while it is minimized, rather than downgrading the quality of the content item. Previous solutions typically downgraded the quality of a video when presented in a smaller format (e.g., "mini-player" format) because the video was downloaded with a higher resolution and then transcoded to a lower quality to suit the site of the player. In comparison, implementations may maintain the higher quality to prevent a situation where after the user "unminimizes" the content item player and the quality remains at a lower presentation value (e.g., when the content item player is switched to a lower quality when minimized, then the subsequent larger content item player continues to show a low quality until the next high-quality content item chunk can be downloaded). In some implementations, a resolution quality of the content item player is dynamically and transparently switched to match the corresponding content item player size currently being utilized. For example, for the maximized content item player a high resolution quality is implemented, and for the minimized content item player (mini-player) a lower resolution quality is implemented, with an immediate switch between the resolutions upon changing the size of the content item player.

In one implementation, the client-side content item player format selection module 280 directs the client-side content item player generation module 270 to maintain the format quality of the content item player when minimizing the content item player and/or when returning the content item player to its original format. In other implementations, the client-side content item player format selection module 280 directs the client-side content item player generation module 270 to transparently and dynamically switch the format quality of the content item player when minimizing the content item player and/or when returning the content item player to its original format. In another implementation, the server-side content item player format selection module 230 may direct the server-side content item player generation module 210 and/or the client-side content item player generation module 270 with respect to format quality.

In some implementations, the dynamic size-adjustable content item player may be part of a video-chatting feature in a social network. For example, a user may view a video of a person that they are video-chatting with in a minimized view while simultaneously browsing the social network application. The user could then make the video-chatting window/player full-sized again at will.

The content sharing platform application may also continue to show a content item that is being recorded by a camera of the user's device, while allowing the user to browse and/or interact with other features in the content sharing platform application. For example, a video that is currently being recorded by the client device may be shown to the user in a "mini-player" format while the user is sharing previously-recorded videos, or changing video-recording settings.

In some implementations, a mapping application may show a live navigation map in a minimized (e.g., "mini-player") view of a content item player, so that the user can change navigation settings and still view what is coming up in his or her navigation route.

Various social networks and content sharing platforms can utilize the above-describe implementations. In addition, the above implementations can be utilized for search results and/or electronic mail clients, for example.

Figure 3A:
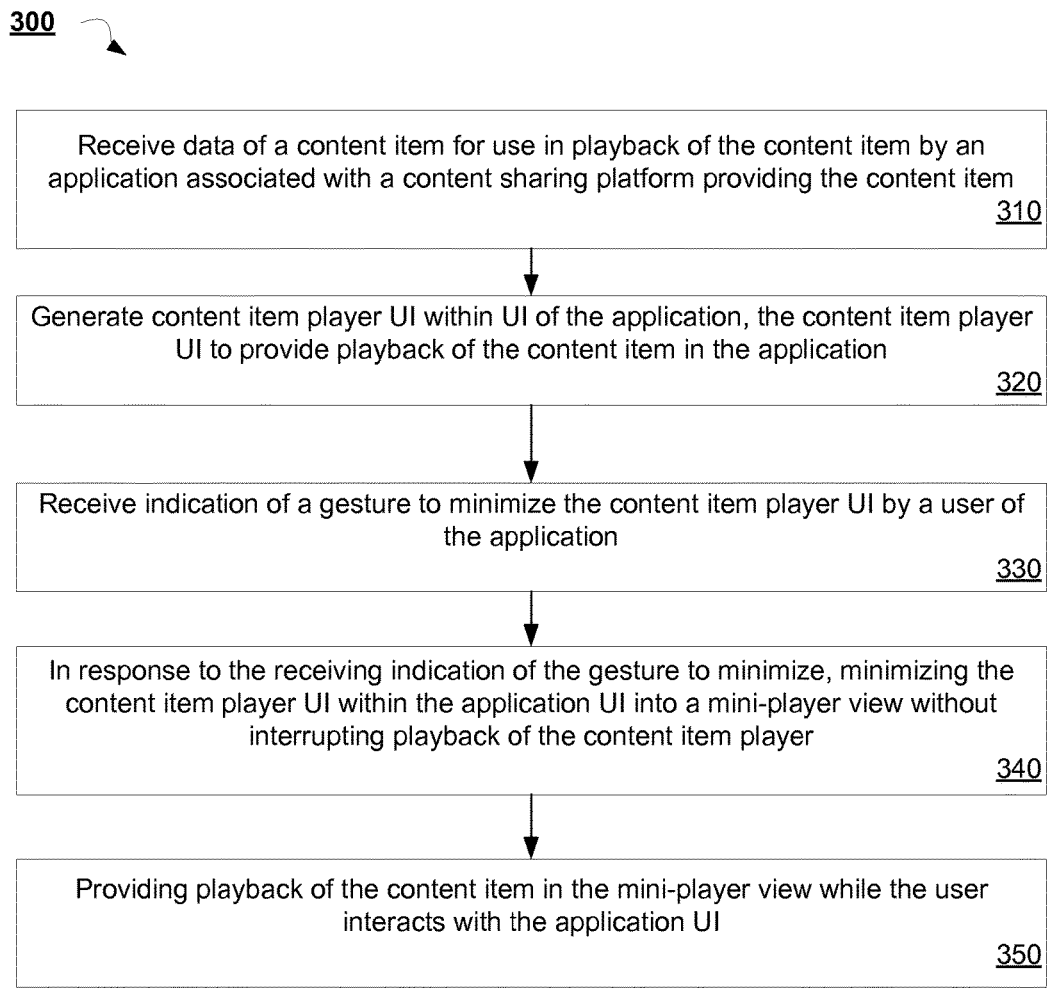

FIGS. 3A and 3B are flow diagrams illustrating a method 300 for providing a dynamic size-adjustable content item player by a client device, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by client-side content item player component 115 as shown in FIGS. 1 and 2.

Referring to FIG. 3A, method 300 begins at block 310 when the client-side content item player component receives data of a content item for use in playback of the content item by an application associated with a content sharing platform providing the content item. At block 320, a content item player UI is generated within a UI of the application. The content item player UI provides playback of the content item in the application.

Then, at block 330, an indication of a gesture to minimize the content item player UI is received from a user of the application at the client device. In one implementation, the gesture may be a selection (e.g., tap or click) by the user of a minimization icon shown on the content item player UI. In another implementation, the gesture may be a swipe downward by the user within the content item player UI.

At block 340, in response to receiving the indication of the minimization gesture, the content item player UI is minimized into a mini-player view within the application UI without interrupting the playback of the content item in the content item player. In one implementation, the mini-player view is a thumbnail version of the content item player that continues to show playback of the content item. The position of the mini-player view within the application UI may be determined based on configuration settings of the application, or may be a default location.

Subsequently, at block 350, playback of the content item in the mini-player view is provided while the user interacts with the application UI. In one implementation, the mini-player view of the content item player persists on top of the application UI while the user is interacting with the application UI. The user may browse and/or interact with interfaces, functions and menus related to the content sharing platform that are provided in the application UI. For example, the other interfaces, functions and menus may include a suggestions interface of what to watch next, a search interface for content items of the content sharing platform, a browsing interface for content items of the content sharing platform, a settings interface, a subscriptions interface, a playlists interface, a favorites interface, a history interface, an uploads interface, and so on. The user may interact with these interfaces, functions, and menus as they normally would without interrupting playback of the content item.

Referring to FIG. 3B, method 300 may continue at block 360 when, while the content item player is in the mini-player view format within the application UI, an indication is received of a user gesture made with respect to the content item player UI in the mini-player view. At block 370, a navigation gesture is determined that corresponds to the received indication of the user gesture. For example, if the user gesture is a swipe left or a swipe right within the mini-player view, the navigation action is to dismiss the content item player UI. In another example, if the user gesture is a tap or a swipe upwards within the mini-player view, the navigation action is to maximize the content item player UI.

At block 380, if the navigation action is to dismiss the content item player UI, then playback of the content item player is stopped and the content item player UI is removed from the application UI. At block 390, if the navigation action is to maximize the content item player UI, then the content item player is returned from the mini-player view to an original viewing format of the content item player UI in the application UI without interrupting playback of the content item in the content item player. In one implementation, the mini-player view is a thumbnail version of the content item player that continues to show playback of the content item. The position of the mini-player view within the application UI may be determined based on configuration settings of the application, or may be a default location.

FIG. 4 is a flow diagram illustrating another method 400 for providing a dynamic size-adjustable content item player at a client device by a server device, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by server-side content item player component 140, as shown in FIGS. 1 and 2.

Referring to FIG. 4, method 400 begins at block 410 when the server-side content item player component provides, to a content sharing platform application at a client device, data of a content item hosted by the content sharing platform and data of a content item player UI for use in playback of the content item by the application. The application then utilizes the received data to provide the content item player UI in the application for playback of the content item.

At block 420, an indication of a gesture is received from the application at the client device. The gesture is made the user to minimize the content item player UI within a UI of the application. Subsequently, at block 430, in response to receiving the indication of the gesture, data is provided to the application to generate a mini-player view of the content item player UI without interrupting playback of the content item in the content item player. The application may then utilize the provided data to generate the mini-player view of the content item player UI within the application UI. In one implementation, the mini-player view is a thumbnail version of the content item player UI that persists on top of the application UI and continues to show playback of the content item. The position of the mini-player view within the application UI may be determined based on configuration settings of the application, or may be a default location.

At block 440, data corresponding to user interactions with the application UI are received. The data is received while the application continues to provide playback of the content item in the mini-player view within the application UI. The user may browse and/or interact with interfaces, functions and menus related to the content sharing platform that are provided in the application UI. For example, the other interfaces, functions and menus may include a suggestions interface of what to watch next, a search interface for content items of the content sharing platform, a browsing interface for content items of the content sharing platform, a settings interface, a subscriptions interface, a playlists interface, a favorites interface, a history interface, an uploads interface, and so on. The user may interact with these interfaces, functions, and menus as they normally would without interrupting playback of the content item.

Figure 5B:
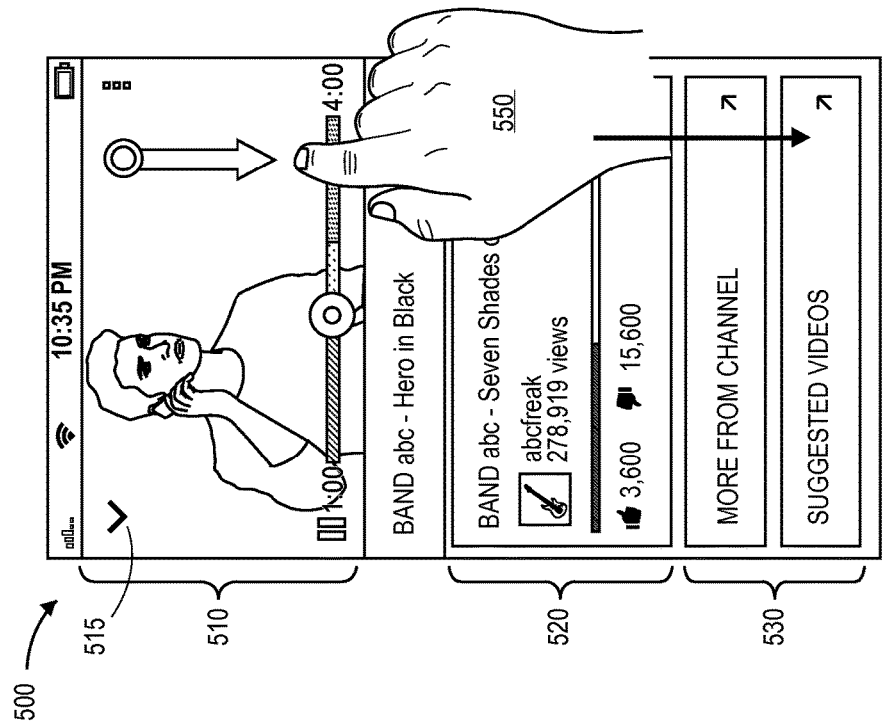
FIGS. 5A and 5B are example screenshots illustrating UIs for providing a dynamic size-adjustable content item player.
Figure 5A:
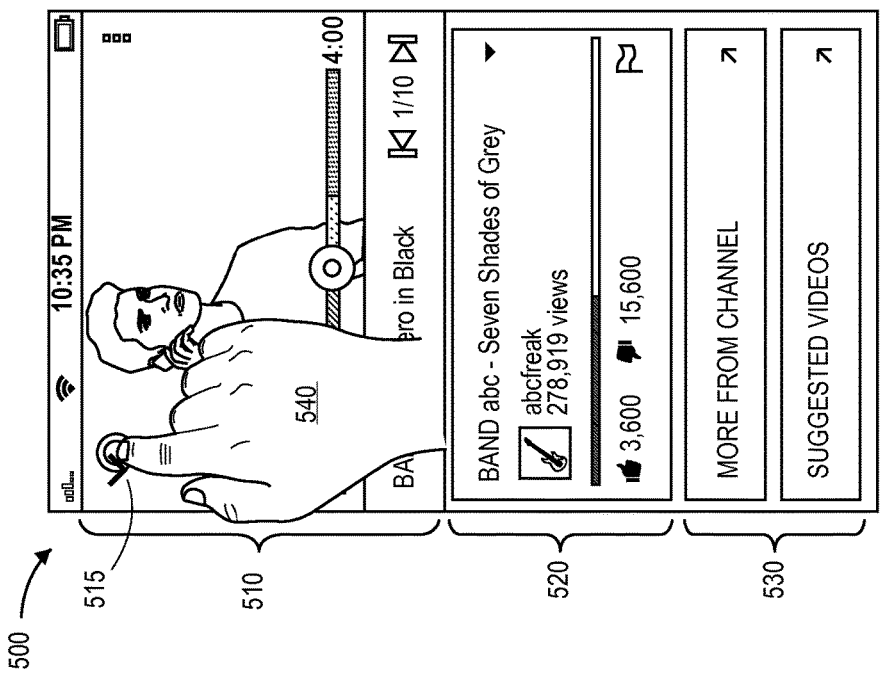

FIGS. 5 through 7 are example screenshots illustrating UIs for providing a dynamic size-adjustable content item player. FIG. 5A illustrates an example screenshot of a content sharing platform application UI 500 provided to a user viewing a content item of the content sharing platform. Application UI 500 includes a content item player 510 provided by the content sharing platform application. Information corresponding to the content item currently playing back in content item player 510 may be shown in content item information portion 520 of the application UI 500. Additional menu options 530 related to the content item currently playing back in the content item player 510 may also be shown in application UI 500.

Content item player 510 may include a minimization indicator 515 (illustrated here as a downward-facing caret, 'v'). The user may minimize the content item player 510 within the application UI 500 by selecting 540 (e.g., taps or clicks) the minimization indicator 515. FIG. 5B illustrates the same application UI 500 of FIG. 5A with the user minimizing the content item player 510 by swiping down 550 in the content item player 510 (in lieu of selecting the minimization indicator 515). In one implementation, as long as the user begins or starts the swiping down motion 550 within the content item player 510 UI, the minimization navigation action registers as applying to the content item player 510 (even if the swipe down gesture stops outside of the content item player 510 UI portion of the application UI 500).

FIG. 6A illustrates an example screenshot of a content sharing platform application UI 600 provided to a user after the user minimizes a content item player in the application UI 600. In one implementation, application UI 600 is a screenshot of what is displayed to a user after the minimization actions of either of FIG. 5A or 5B are performed. The minimized content item player is shown as mini-player 610 in the application UI 600. The mini-player 610 persists on top of the application UI 600 and continues playback of the content item while the user continues to navigate other interface and menus of the application UI 600. The location of mini-player 610 within application UI 600 may vary and be implementation-dependent. Application UI 600 may include interfaces for playlists 620, videos 630, channels 640, searching 650, and a home menu 660. As shown in FIG. 6A, the playlists interface 620 is currently active and displaying multiple playlist suggestions 625 to the user.

Figure 6C:
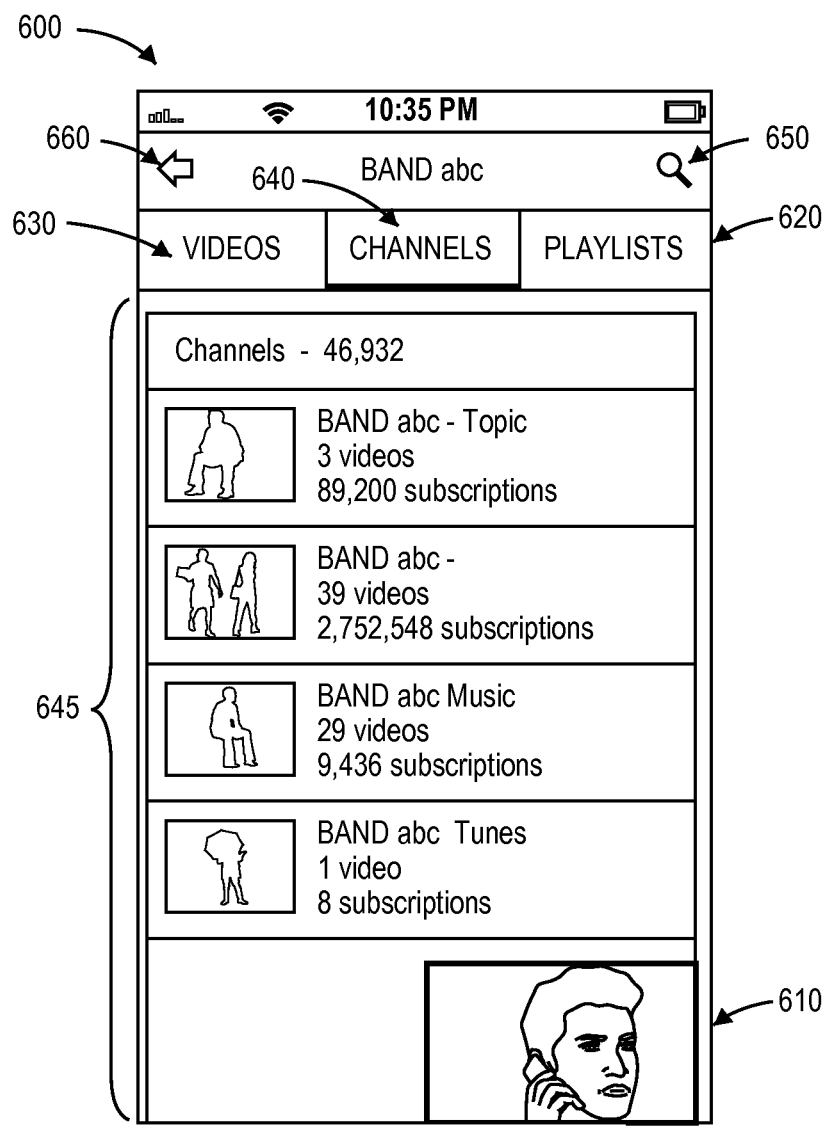

As shown in FIG. 6B, the user can navigate these interfaces and menus while the mini-player 610 continues playback of the content item uninterrupted. FIG. 6B illustrates the application UI 600 of FIG. 6A with the user selecting 670 a different interface (e.g., the channels interface 640) to view. FIG. 6C illustrates the application UI 600 after the user navigates 670 to the different interface of the channels interface 640. As shown, the channels interface UI 645 is now displayed, while the mini-player 610 continues to persist and provide playback of the content item in the application UI.

Figure 7A:
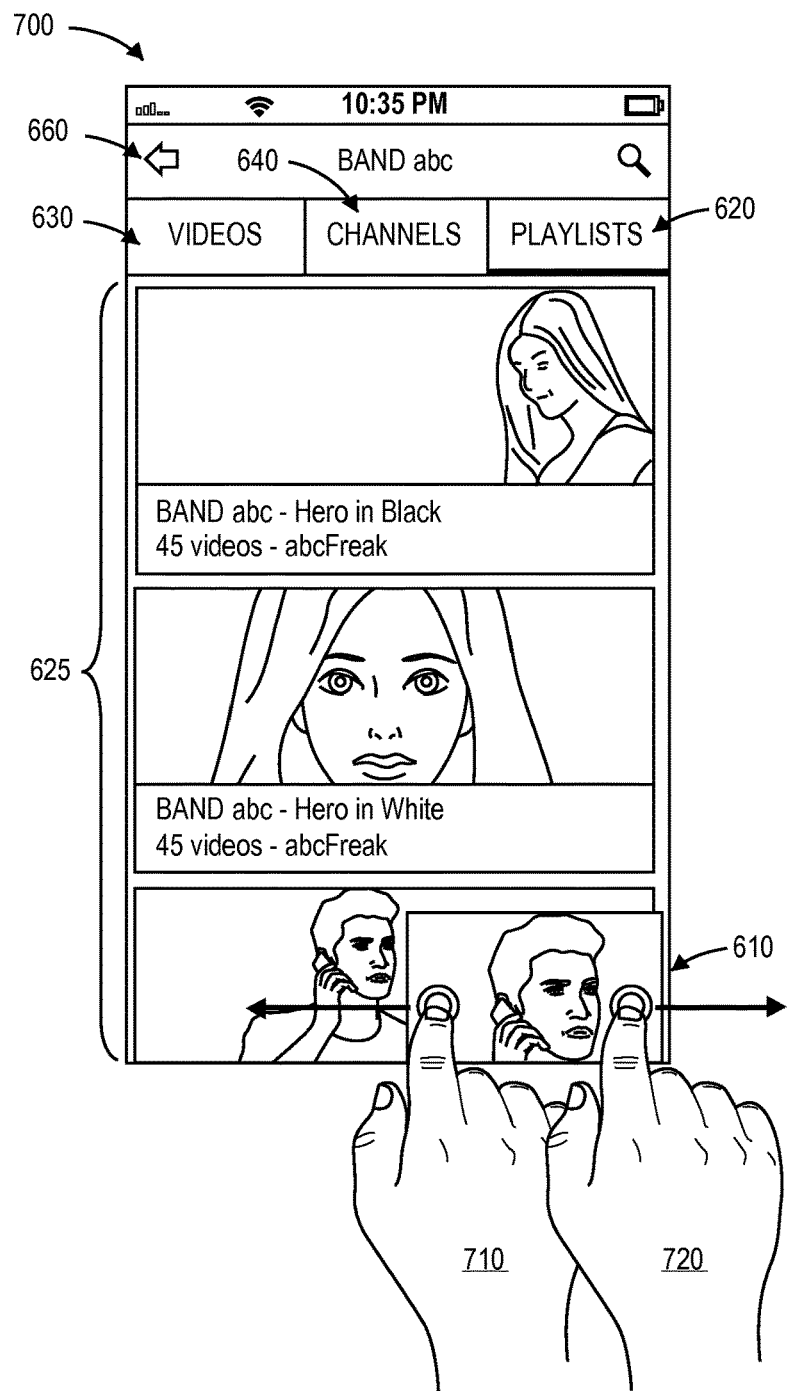
FIGS. 7A, 7B, 7C, and 7D are example screenshots illustrating UIs for providing a dynamic size-adjustable content item player.
Figure 7B:
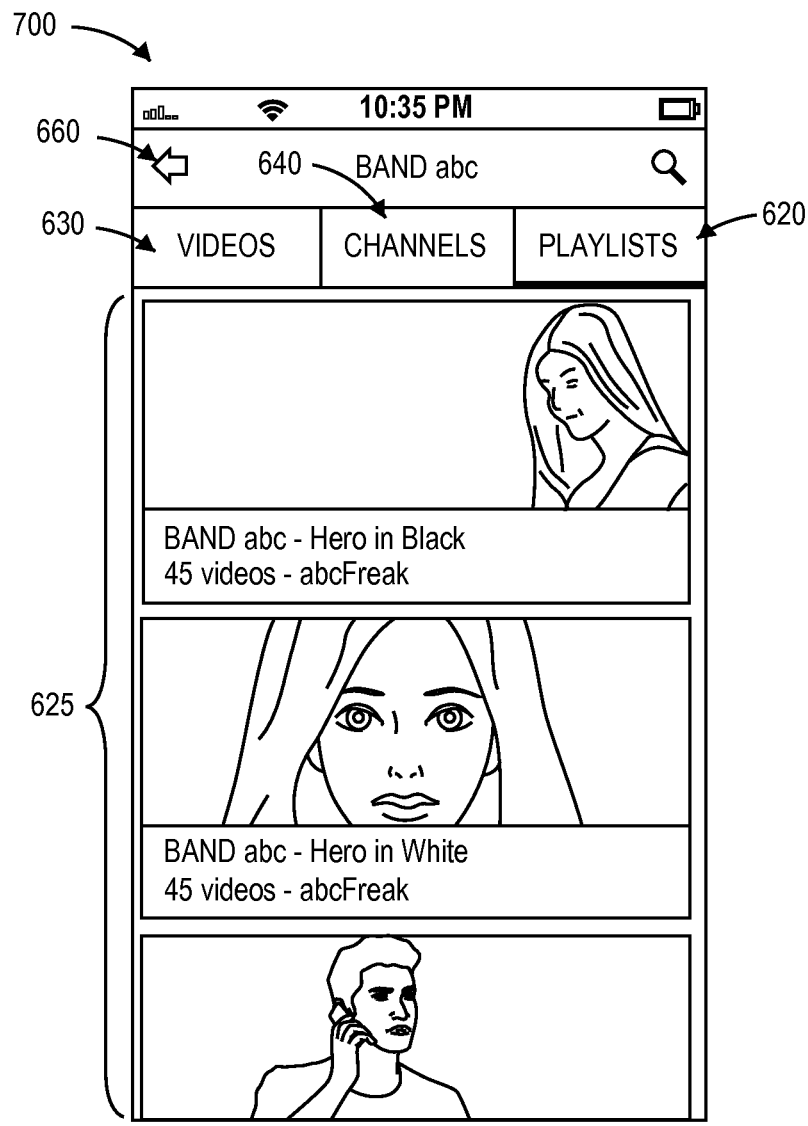

FIG. 7A illustrates an example screenshot of a content sharing platform application UI 700 with the minimized mini-player 610 of the content item player shown. Application UI 700 may be the same as application UI 600 of FIG. 6A. In order to dismiss the mini-player 610, the user may swipe left 710 or swipe right 720 on the mini-player 610. FIG. 7B illustrates the application UI 700 subsequent to the user dismissing the mini-player 610 in FIG. 7A. Application UI 700 is the same as FIG. 7A, but without the content item player (e.g., mini-player) present.

Figure 7C:
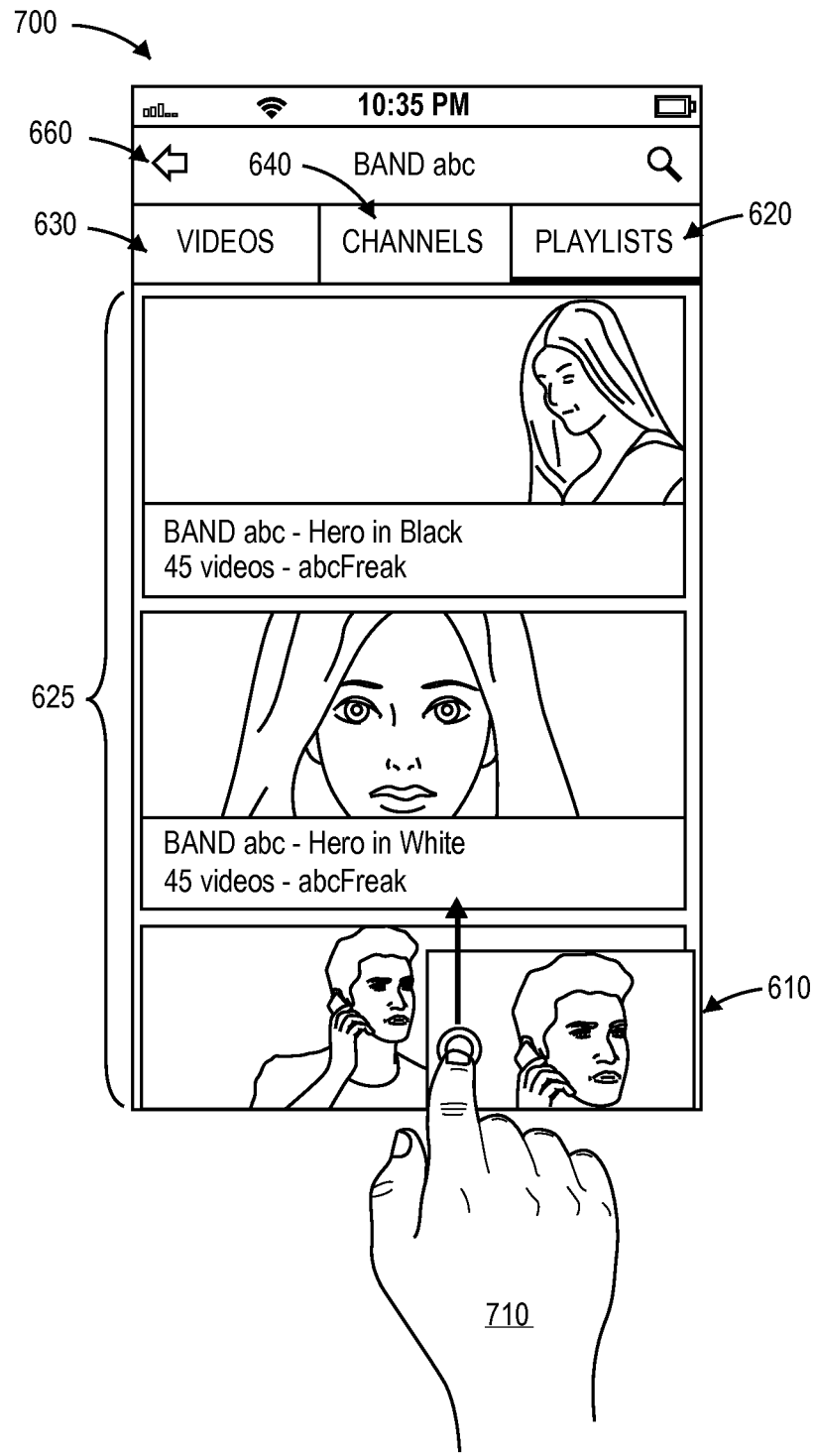
Figure 7D:
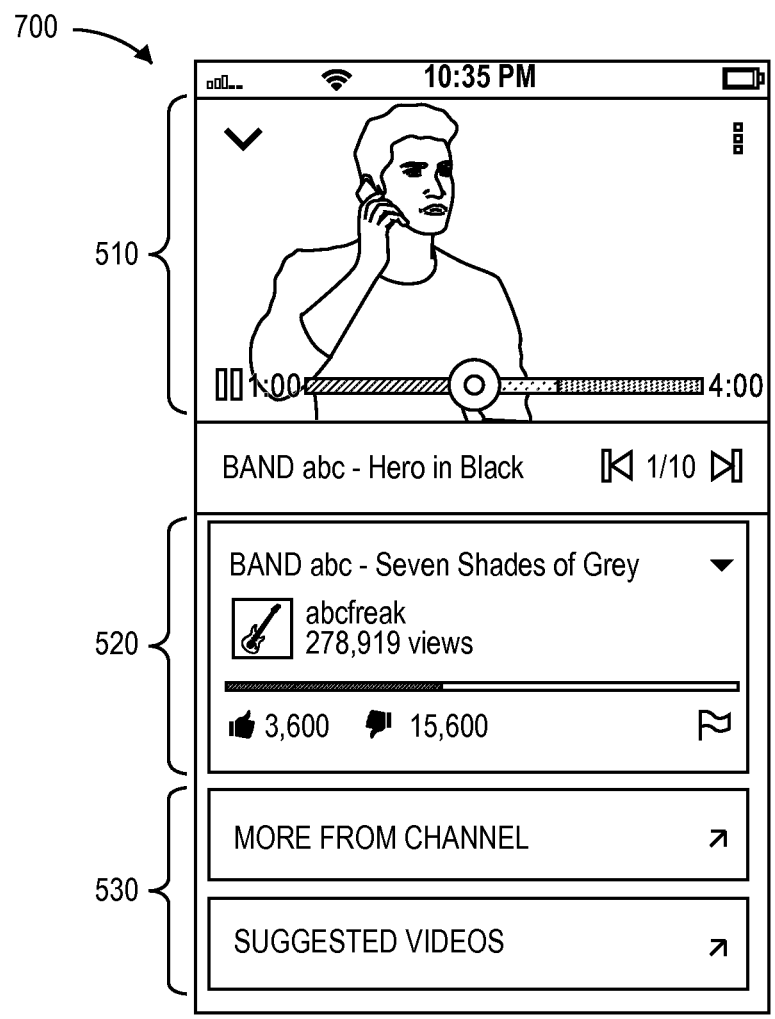

A shown in FIG. 7C, the user may maximize or return the mini-player 610 to its original or default content item player format. In one implementation, the user may swipe upwards 710 in the mini-player 610 to maximize the content item player. FIG. 7D illustrates the application UI 700 subsequent to the user maximizing the mini-player 610 in FIG. 7C. As shown, the application UI 700 now displays the content item player 510 in its initial original/default format, which corresponds to application UI 500 of FIG. 5A.

Although specific implementations of user gestures were illustrated with respect to FIGS. 5 through 7, other types of user gestures and directionality are envisioned in implementations of the disclosure and are not solely limited to those specifically illustrated in the example screenshots.

Figure 8:
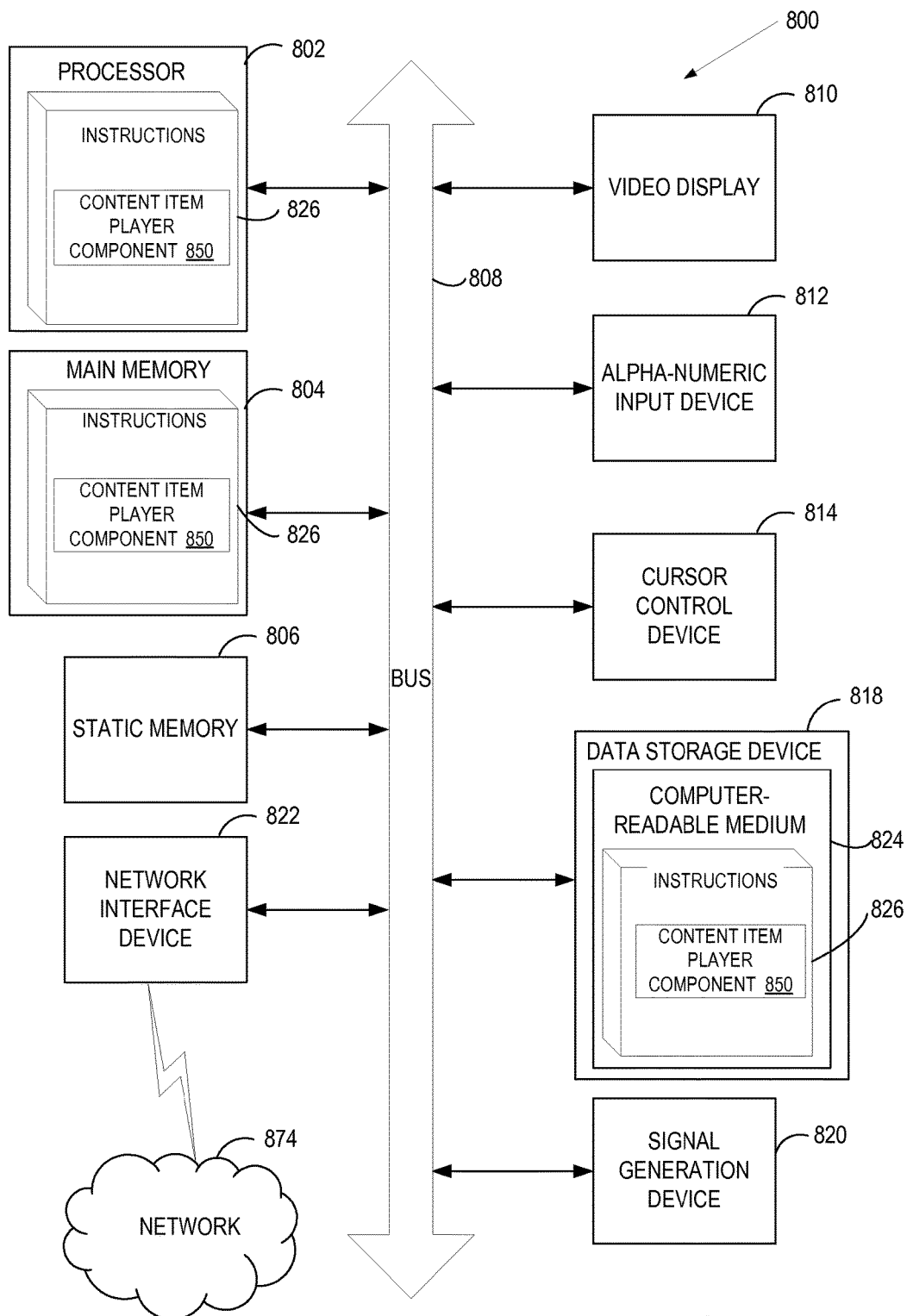
FIG. 8 is a block diagram illustrating an exemplary computer system, according to some implementations.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD), a cathode ray tube (CRT), or a touch screen), an alphanumeric input device 812 (e.g., a keyboard), a cursor control device 814 (e.g., a mouse), and a signal generation device 820 (e.g., a speaker).

The data storage device 818 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 874 via the network interface device 822.

In one embodiment, the instructions 826 include instructions for a content item player component 850, which may correspond, respectively, to client-side content item player component 115 and/or server-side content item player component 140 described with respect to FIGS. 1 and 2, and/or a software library containing methods that provide a dynamic size-adjustable content item player for a content sharing platform. While the computer-readable storage medium 824 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing, by an electronic device, a content item player for playback of a content item in a first portion of a user interface (UI) of an application executed on the electronic device;
   receiving a first indication of a first gesture made with respect to the first portion of the UI for playback of the content item, the first gesture corresponding to an action of minimizing the content item player;
   in response to receiving the first indication, minimizing the content item player into a mini-player shown on the application UI without interrupting the playback of the content item in the content item player, wherein the mini-player is positioned with a pre-determined size and position within the application UI and relative to the application UI, and wherein a display quality format of the mini-player is the same as the display quality format of the content item player when originally displayed in the application UI;
   receiving a second indication of a second gesture made with respect to the mini-player;
   responsive to the second gesture comprising a minimization gesture to dismiss the mini-player, stopping playback of the content item and removing the mini-player from the application UI on the electronic device; and
   responsive to the second gesture comprising a maximization gesture to maximize the mini-player, returning the content item player to an original presentation format in the application UI, the original presentation format comprising presentation in the first portion of the UI of the application.

2. The method of claim 1, wherein the mini-player persists at the foreground of the application UI while a user interacts with the application UI.

3. The method of claim 1, wherein a user interacts with at least one of a suggestions interface, a search interface, a browsing interface, a settings interface, a subscriptions interface, a playlists interface, a favorites interface, a history interface, or an uploads interface of the application UI while the mini-player provides uninterrupted playback of the content item to the user.

4. The method of claim 1, wherein the first gesture to minimize the content item player comprises a selection of a minimization indicator on the content item player.

5. The method of claim 1, further comprising, prior to receiving the second indication and in response to receiving a third indication of a third gesture made with respect to the mini-player to move the mini-player within the application UI, moving the mini-player to a second portion of the application UI while maintaining a minimized size of the mini-player, the second portion indicated by the third gesture.

6. The method of claim 1, wherein the removing the mini-player further comprising applying animation to the mini-player while the mini-player is removed from the application UI.

7. The method of claim 1, wherein the minimization gesture to dismiss the mini-player comprises at least one of a swipe right gesture or a swipe left gesture made with respect to the mini-player.

8. The method of claim 7, wherein the maximization gesture to maximize the mini-player comprises a click in the UI of the mini-player.

9. The method of claim 7, wherein the maximization gesture to maximize the mini-player comprises a swipe gesture in a predetermined direction in a UI of the mini-player.

10. The method of claim 1, wherein the removing the mini-player further comprising applying fading to the mini-player while the mini-player is removed from the application UI.

11. The method of claim 1, wherein the minimizing the content item player further comprising applying fading to the content item player while the content item player transforms into the mini-player.

12. The method of claim 1, wherein the maximization gesture to maximize the mini-player comprises a tap in the UI of the mini-player.

13. The method of claim 1, wherein the minimizing the content item player further comprising applying animation to the content item player while the content item player transforms into the mini-player.

14. An apparatus comprising:
   a display device;
   a memory communicably coupled to the display device; and
   a processing device communicably coupled to the memory, the processing device to execute instructions to:
   provide a content item player for playback of a content item in a first portion of a user interface (UI) of an application executed on the electronic device, the application UI displayed by the display device;
   receive a first indication of a first gesture made with respect to the first portion of the UI for playback of the content item, the first gesture corresponding to an action of minimizing the content item player;
   in response to receiving the first indication, minimize the content item player into a mini-player shown on the application UI without interrupting the playback of the content item in the content item player, wherein the mini-player is positioned with a determined size and position within the application UI and relative to the application UI, and wherein a display quality format of the mini-player is the same as the display quality format of the content item player when originally displayed in the application UI;

receiving a second indication of a second gesture made with respect to the mini-player;

responsive to the second gesture comprising a minimization gesture to dismiss the mini-player, stop playback of the content item and remove the mini-player from the application UI on the electronic device; and responsive to the second gesture comprising a maximization gesture to maximize the mini-player, returning the content item player to an original presentation format in the application UI, the original presentation format comprising presentation in the first portion of the UI of the application.

15. The apparatus of claim 14, wherein a user interacts with at least one of a suggestions interface, a search interface, a browsing interface, a settings interface, a subscriptions interface, a playlists interface, a favorites interface, a history interface, or an uploads interface of the application UI while the mini-player provides uninterrupted playback of the content item to the user.

16. The apparatus of claim 14, wherein the first gesture to minimize the content item player comprises a selection of a minimization indicator on the content item player.

17. The apparatus of claim 14, wherein the processing device is further to, prior to receiving the second indication and in response to receiving a third indication of a third gesture made with respect to the mini-player to move the mini-player within the application UI, move the mini-player to a second portion of the application UI while maintaining a minimized size of the mini-player, the second portion indicated by the third gesture.

18. The apparatus of claim 14, wherein the minimization gesture to dismiss the mini-player comprises at least one of a swipe right gesture or a swipe left gesture made with respect to the mini-player.

19. The apparatus of claim 18, wherein the maximization gesture to maximize the mini-player comprises a tap in the UI of the mini-player.

20. The apparatus of claim 18, wherein the maximization gesture to maximize the mini-player comprises a click in the UI of the mini-player.

21. The apparatus of claim 18, wherein the maximization gesture to maximize the mini-player comprises a swipe gesture in a predetermined direction in the UI of the mini-player.

22. A non-transitory machine-readable storage medium storing instructions which, when executed, cause a processing device to perform operations comprising:

providing, by the processing device of a content sharing platform, first data of a content item hosted by the content sharing platform and second data of a content item player to an application of the content sharing platform executing on a client device, the first and second data utilized by the application for playback of the content item in the content item player at a first portion of an application user interface (UI) of the application;

receiving, by the processing device, a first indication of a first gesture made with respect to the first portion of the application UI, the first gesture corresponding to an action of minimizing the content item player;

in response to receiving the first indication, providing, by the processing device to the application, third data for a mini-player of the content item player, the application to utilize the third data to provide the mini-player shown on the application UI without interrupting the playback of the content item in the content item player, wherein the mini-player is positioned with a determined size and position within the application UI and relative to the application UI, and wherein a display quality format of the mini-player is the same as the display quality format of the content item player when originally displayed in the application UI;

receiving a second indication of a second gesture made with respect to the mini-player;

responsive to the second gesture comprising a minimization gesture to dismiss the mini-player, stop playback of the content item and remove the mini-player from the application UI on the electronic device; and responsive to the second gesture comprising a maximization gesture to maximize the mini-player, returning the content item player to an original presentation format in the application UI, the original presentation format comprising presentation in the first portion of the UI of the application.

23. The non-transitory machine-readable storage medium of claim 22, wherein a user interacts with at least one of a suggestions interface, a search interface, a browsing interface, a settings interface, a subscriptions interface, a playlists interface, a favorites interface, a history interface, or an uploads interface of the application UI while the mini-player provides uninterrupted playback of the content item to the user.

24. The non-transitory machine-readable storage medium of claim 22, wherein the first gesture to minimize the content item player comprises a selection of a minimization indicator on the content item player.

25. The non-transitory machine-readable storage medium of claim 22, wherein the operations further comprise, prior to receiving the second indication and in response to receiving a third indication of a third gesture made with respect to the mini-player to move the mini-player within the application UI, moving the mini-player to a second portion of the application UI while maintaining a minimized size of the mini-player, the second portion indicated by the third gesture.

26. The non-transitory machine-readable storage medium of claim 22, wherein the minimization gesture to dismiss the mini-player comprises at least one of a swipe right gesture or a swipe left gesture made with respect to the mini-player.

27. The non-transitory machine-readable storage medium of claim 26, wherein the maximization gesture to maximize the mini-player comprises a tap in the UI of the mini-player.

28. The non-transitory machine-readable storage medium of claim 26, wherein the maximization gesture to maximize the mini-player comprises a click in the UI of the mini-player.

29. The non-transitory machine-readable storage medium of claim 26, wherein the maximization gesture to maximize the mini-player comprises a swipe gesture in a predetermined direction in the UI of the mini-player.

* * * * *